(12) United States Patent
Becker et al.

(10) Patent No.: US 9,635,500 B1
(45) Date of Patent: Apr. 25, 2017

(54) ADAPTIVE GEOLOCATION OF USERS TO FACILITATE USE OF GEOFENCES

(71) Applicant: INTUIT INC., Mountain View, CA (US)

(72) Inventors: Richard J. Becker, Alberta (CA); Gregory K. Coulombe, Alberta (CA); Daniel L. Moise, Edmonton (CA)

(73) Assignee: INTUIT INC, Mountain View, CA (US)

(*) Notice: Subject to any disclaimer, the term of this patent is extended or adjusted under 35 U.S.C. 154(b) by 1141 days.

(21) Appl. No.: 13/653,302

(22) Filed: Oct. 16, 2012

(51) Int. Cl.
*H04W 4/02* (2009.01)
*G01S 19/34* (2010.01)
*G01S 19/48* (2010.01)

(52) U.S. Cl.
CPC ............ *H04W 4/021* (2013.01); *G01S 19/34* (2013.01); *G01S 19/48* (2013.01); *H04W 4/022* (2013.01)

(58) Field of Classification Search
CPC ......... H04W 4/021; H04W 4/02; G01S 19/34; G01S 19/48; G01S 5/0027; G01S 5/00272
See application file for complete search history.

(56) References Cited

U.S. PATENT DOCUMENTS

| 8,810,454 | B2* | 8/2014 | Cosman | H04W 64/00 342/451 |
| 2013/0178233 | A1* | 7/2013 | McCoy | H04W 4/021 455/456.3 |
| 2013/0326137 | A1* | 12/2013 | Bilange | G06F 12/0866 711/113 |
| 2014/0057648 | A1* | 2/2014 | Lyman | H04W 4/021 455/456.1 |

* cited by examiner

*Primary Examiner* — Cassie Galt
(74) *Attorney, Agent, or Firm* — Patterson & Sheridan, LLP

(57) ABSTRACT

The disclosed embodiments provide a system that facilitates geolocation of a user. The system includes a server and an electronic device. First, the server receives a location of the user from an electronic device of the user and determines a window around the location. Next, the server transmits the window and one or more geofences within the window to the electronic device. The electronic device then obtains one or more precision buffers associated with one or more levels of accuracy for detecting the location of the user near the one or more geofences. Finally, the electronic device facilitates use of the one or more geofences by varying a geolocation technique for tracking the location of the user based on the one or more precision buffers.

25 Claims, 6 Drawing Sheets

ADAPTIVE GEOLOCATION OF USERS TO FACILITATE USE OF GEOFENCES

BACKGROUND

Related Art

The disclosed embodiments relate to geofences for location-based services. More specifically, the disclosed embodiments relate to techniques for performing adaptive geolocation of users to facilitate use of geofences with the users.

Geofences may be virtual perimeters for geographic areas that are used by location-based services to perform tasks related to a user's location. For example, a location-based service associated with a mobile phone may use geolocation to detect the entry into and/or exit from a geofence by a user of the mobile phone. The location-based service may then generate a notification related to the geofence, such as a greeting from a merchant within the geofence and/or an email informing other users of the user's arrival within the geofence. Alternatively, the location-based service may enable and/or disable one or more settings on the mobile phone based on the user's entry into and/or exit from the geofence.

Unfortunately, techniques for accurately performing geofencing on portable electronic devices are typically associated with high power consumption. For example, a Global Positioning System (GPS) receiver may enable accurate detection of a user's proximity to a geofence on a mobile phone. On the other hand, constant use of the GPS receiver may increase battery usage on the mobile phone and reduce the runtime of the mobile phone on battery power.

Moreover, techniques for conserving power during geofencing may result in reduced geofencing accuracy. For example, a mobile phone may detect a user's proximity to geofences based on location updates obtained every 60 seconds from a GPS receiver on the mobile phone. In turn, the mobile phone may reduce power consumption by the GPS receiver by switching the GPS receiver off in between location updates. However, the intermittent nature of the location updates may cause the mobile phone to miss the user's entry into and/or exit from a geofence in between two location updates.

Hence, use of geofences may be facilitated by managing the tradeoff between power consumption and accuracy in geolocation techniques used to perform geofencing.

SUMMARY

The disclosed embodiments provide a system that facilitates geolocation of a user. The system includes a server and an electronic device. First, the server receives a location of the user from an electronic device of the user and determines a window around the location. Next, the server transmits the window and one or more geofences within the window to the electronic device. The electronic device then obtains one or more precision buffers associated with one or more levels of accuracy for detecting the location of the user near the one or more geofences. Finally, the electronic device facilitates use of the one or more geofences by varying a geolocation technique for tracking the location of the user based on the one or more precision buffers.

In some embodiments, the electronic device also uses the geolocation technique to obtain an update to the location corresponding to an exit from the window by the user, and the server also updates the window and the one or more geofences based on the update.

In some embodiments, the update to the location is associated with a boundary of a window inset buffer for the window.

In some embodiments, obtaining the one or more precision buffers for the one or more geofences involves at least one of obtaining the one or more precision buffers from the server, and generating the one or more precision buffers based on a size of the one or more geofences.

In some embodiments, varying the geolocation technique for tracking the location of the user based on the one or more geofences and the one or more precision buffers involves detecting the location of the user in a precision buffer from the one or more precision buffers, and adjusting the geolocation technique to detect the location at a level of accuracy for the precision buffer.

In some embodiments, the one or more geofences and the one or more precision buffers correspond to one or more sets of concentric regions.

In some embodiments, the geolocation technique is associated with at least one of a Global Positioning System (GPS) receiver, a wireless network, a cellular network, and a network address associated with the user.

In some embodiments, the window is based on at least one of a speed of the user and a density of the one or more geofences in proximity to the location.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
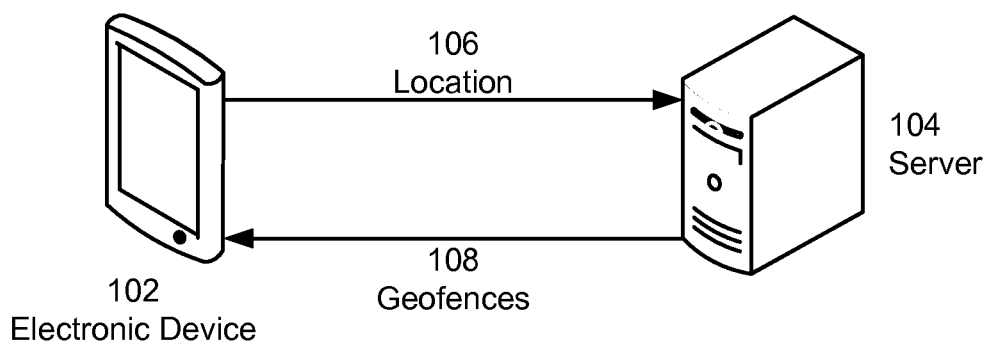
FIG. 1 shows a schematic of a system in accordance with the disclosed embodiments.

The disclosed embodiments provide a method and system for performing geofencing. As shown in FIG. 1, an electronic device 102 may transmit a location 106 of a user of electronic device 102 to a server 104. For example, electronic device 102 may be a mobile phone, personal computer, laptop computer, tablet computer, portable media player, and/or other network-enabled device. To detect the user's location 106, electronic device 102 may use a geolocation technique associated with a Global Positioning System (GPS) receiver, WiFi receiver, Bluetooth (Bluetooth™ is a registered trademark of Bluetooth SIG, Inc.) receiver, radio frequency identification (RFID) receiver, cellular receiver, and/or network address (e.g., Internet Protocol (IP) address) associated with electronic device 102. Electronic device 102 may then transmit location 106 through a cellular network, WiFi network, local area network (LAN), and/or other type of network to server 104.

Next, server 104 may provide a set of geofences 108 associated with location 106 to electronic device 102, and electronic device 102 may use geofences 108 with the user. For example, electronic device 102 may notify server 104 and/or another server of the user's entry into and/or exit from one or more geofences 108, and the server(s) may transmit a message, greeting, and/or notification associated with the geofence(s) to electronic device 102 for viewing by the user. Alternatively, the server(s) and/or electronic device 102 may change one or more settings on electronic device 102 based on the user's movement into or out of one or more geofences 108. In other words, geofences 108 may represent virtual perimeters that facilitate the operation and/or use of location-based services associated with electronic device 102.

However, updates to location 106 that are used to detect the user's proximity to geofences 108 may be associated with a tradeoff between power consumption and accuracy. For example, electronic device 102 may accurately track the user's movement within and/or among geofences 108 by obtaining continuous updates to location 106 using a GPS receiver. However, constant operation of the GPS receiver may significantly increase the power consumption of electronic device 102 and result in reduced runtime of electronic device 102 on battery power. Conversely, electronic device 102 may conserve power by periodically toggling the GPS receiver on to update location 106 and switching the GPS receiver off during pre-specified periods between updates to location 106. As a result, electronic device 102 may miss important events associated with geofences 108, such as the user passing through a geofence while the GPS receiver is off.

In one or more embodiments, electronic device 102 and server 104 include functionality to facilitate use of geofences 108 by performing adaptive geolocation of the user. As discussed in further detail below with respect to FIG. 2, electronic device 102 and/or server 104 may provide a set of precision buffers associated with different levels of accuracy for detecting location 106 near geofences 108. Electronic device 102 may then vary a geolocation technique for tracking location 106 based on the precision buffers, thus enabling accurate detection of the user's entry into and/or exit from geofences 108 without increasing the power consumption of electronic device 102 by more than is necessary to track the user's movements among geofences 108.

Figure 2:
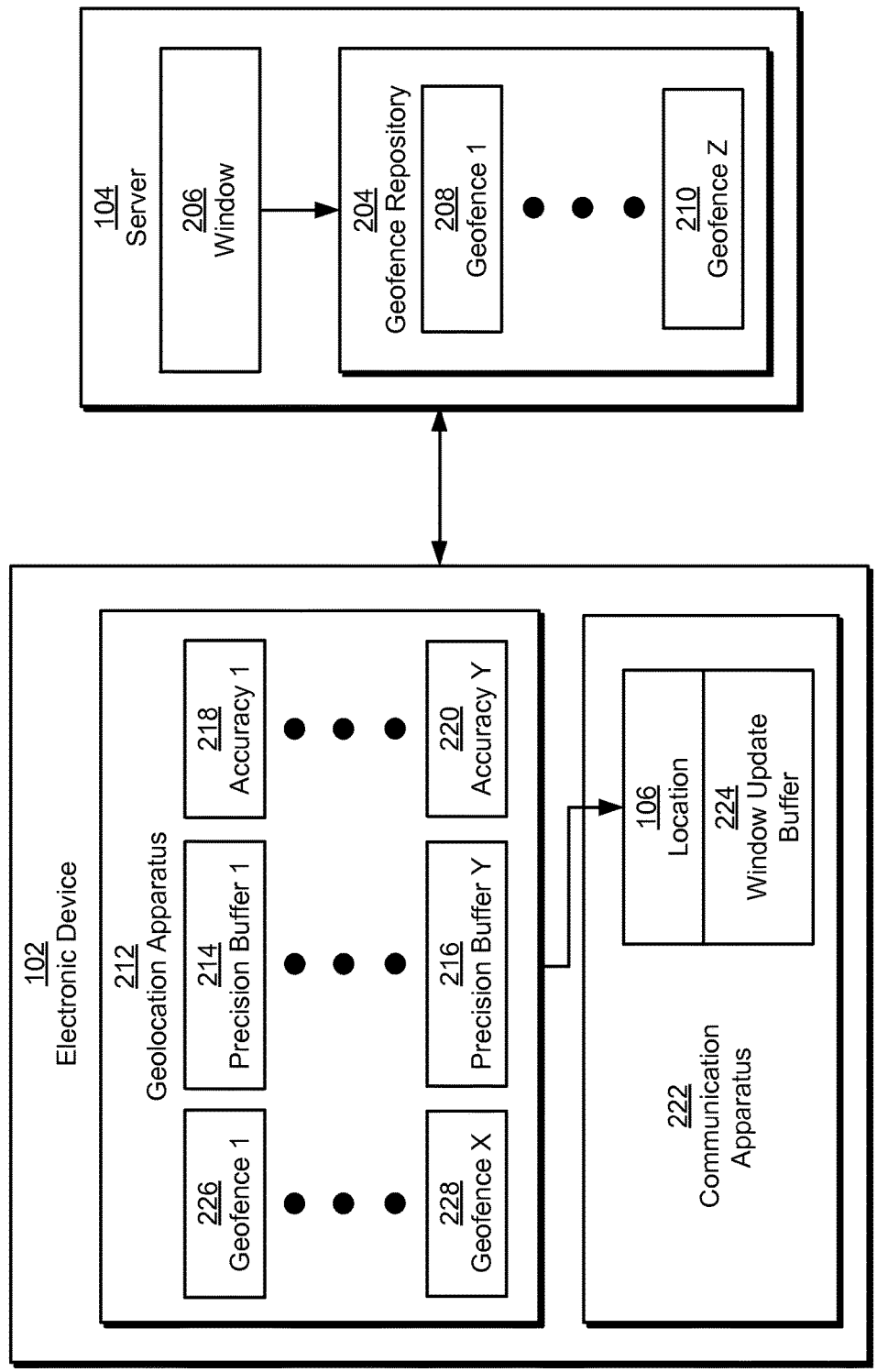
FIG. 2 shows a system for facilitating geolocation of a user in accordance with the disclosed embodiments.

FIG. 2 shows a system for facilitating geolocation of a user in accordance with the disclosed embodiments. As mentioned above, the geolocation may be performed by electronic device 102 based on a set of precision buffers (e.g., precision buffer 1 214, precision buffer y 216) associated with levels of accuracy (e.g., accuracy 1 218, accuracy y 220) for detecting the user's location 106 in proximity to a set of geofences (e.g., geofence 1 226, geofence x 228). In other words, electronic device 102 may update location 106 to detect the user's movement within and/or among nearby geofences.

To obtain the geofences, a communication apparatus 222 in electronic device 102 may use a network connection (e.g., WiFi connection, cellular connection, wired network connection, etc.) to provide location 106 to server 104, and server 104 may determine a window 206 around location 106. For example, server 104 may form window 206 as a circular region around location 106.

In one or more embodiments, window 206 is generated dynamically based on one or more characteristics associated with location 106. First, window 206 may be based on a speed of the user, which may be calculated from updates to location 106 and/or other information from electronic device 102. For example, window 206 may be larger if the user is moving quickly (e.g., driving) and smaller if the user is moving slowly (e.g., walking) Second, window 206 may be based on a density of geofences associated with location 106. For example, window 206 may be smaller if the density of geofences around location 106 is relatively high and larger if the geofences around location 106 are relatively sparse.

Once window 206 is determined, server 104 may obtain one or more geofences (e.g., geofence 1 208, geofence z 210) within window 206 from a geofence repository 204 and transmit window 206 and the associated geofences (e.g., geofence 1 226, geofence x 228) to electronic device 102. For example, server 104 may perform a search and/or query for geofences from geofence repository 204 that are entirely and/or partially within window 206 and provide the geofences that match the query to electronic device 102.

Next, a geolocation apparatus 212 on electronic device 102 may obtain the precision buffers and/or levels of accuracy based on the received geofences. Each precision buffer may correspond to a concentric region around the corresponding geofence, within which geolocation of the user is performed to a certain level of accuracy by geolocation apparatus 212. For example, a circular precision buffer may be placed around the outside of a circular geofence and associated with a certain type of geolocation technique (e.g., GPS, WiFi, Bluetooth, RFID, cellular, etc.) for use in updating location 106. The precision buffers may be provided by server 104 along with the geofences, or the precision buffers may be generated on electronic device 102 after receiving the geofences.

In addition, the precision buffers and/or levels of accuracy may be based on the sizes of the geofences and/or attributes associated with electronic device 102. More specifically, electronic device 102 and/or server 104 may set the numbers and/or sizes of the precision buffers based on the type and/or capabilities of electronic device 102, an upper limit associated with the precision buffers, and/or a lower limit associated with the precision buffers.

For example, electronic device 102 and/or server 104 may calculate the size of a precision buffer as a percentage of the size of the corresponding precision buffer, which is based on the type (e.g., model) and/or geolocation capabilities of electronic device 102. The percentage may be programmed into electronic device 102 and/or adjusted by server 104 based on geolocation data from electronic device 102 and/or similar electronic devices. Electronic device 102 and/or server 104 may also adjust the size of a precision buffer up to satisfy a lower limit associated with the precision buffer and/or down to satisfy an upper limit associated with the precision buffer. Finally, electronic device 102 and/or server 104 may set the number of precision buffers around a particular geofence based on the importance of the geofence, a setting on electronic device 102, and/or the number of geolocation techniques available on electronic device 102.

Geolocation apparatus 212 may then vary a geolocation technique for tracking location 106 based on the precision buffers and/or levels of accuracy. In other words, if geolocation apparatus 212 detects location 106 in a precision buffer, geolocation apparatus 212 may adjust the geolocation technique to detect the location at a level of accuracy for the precision buffer.

For example, geolocation apparatus 212 may use a relatively coarse-grained and/or low-power technique such as a cellular receiver to track location 106 while the user is outside all precision buffers and/or geofences. After the user enters a first precision buffer associated with a higher level of accuracy, geolocation apparatus 212 may switch to using a more accurate and/or higher-power geolocation technique, such as WiFi triangulation. After the user enters a second precision buffer associated with a highest level of accuracy, geolocation apparatus 212 may switch to using a high-powered GPS receiver to update location 106. Geolocation apparatus 212 may then turn off the GPS receiver and revert to WiFi triangulation after the user leaves the second precision buffer and turn off the WiFi receiver on electronic device 102 after the user leaves the first precision buffer.

By varying the geolocation technique used to track location 106 based on the precision buffers, electronic device 102 and/or server 104 may facilitate accurate detection of the user's entry into and exit from one or more geofences while moderating the increased power consumption associated with accurate geolocation on portable electronic devices. In turn, electronic device 102 and/or server 104 may facilitate use of the geofences by a location-based service. For example, electronic device 102 may notify server 104 and/or another server providing the location-based service of the user's entry into and/or exit from a geofence, allowing the location-based service to generate and transmit notifications, configure electronic device 102, and/or perform other tasks associated with the geofences.

Electronic device 102 may also use location 106 and a window update buffer 224 associated with window 206 to obtain updates to the geofences. Window update buffer 224 may correspond to a region within window 206 that represents an impending exit from window 206 by the user. For example, window update buffer 224 may be a circular region that is slightly smaller than window 206 and centered on the same point as window 206. As with the precision buffers, window update buffer 224 may be provided by server 104 and/or generated by electronic device 102. If an update to location 106 indicates that the user has crossed the boundary of window update buffer 224, communication apparatus 222 may transmit the updated location 106 to server 104, and server 104 may transmit an updated window 206 and set of geofences within window 206 to electronic device 102 based on the updated location 106. Geofences, precision buffers, windows, and window update buffers for facilitating use of geofences are described in further detail below with respect to FIG. 3.

Those skilled in the art will appreciate that the system of FIG. 2 may be implemented in a variety of ways. First, server 104 may be provided by a single physical machine, multiple computer systems, a grid, and/or a cloud computing system. The functionality of server 104 may also be implemented partially or fully on electronic device 102. For example, one or more geofences may be generated and/or stored locally on a separate geofence repository on electronic device 102 instead of geofence repository 204 on server 104. In turn, electronic device 102 may determine window 206 and the precision buffers based on the locally stored geofences instead of obtaining window 206 and/or the precision buffers from server 104. Electronic device 102 may further eliminate window 206 and/or window update buffer 224 altogether if all geofences used by electronic device 102 are stored locally on electronic device 102.

Along the same lines, geolocation apparatus 212 and communication apparatus 222 may be implemented by the same hardware and/or software component, or geolocation apparatus 212 and communication apparatus 222 may execute independently from one another. For example, the functionality of geolocation apparatus 212 and communication apparatus 222 may be provided by one or more software and/or hardware components on electronic device 102. Finally, geofence repository 204 may be provided by a number of data-storage mechanisms, including relational databases, Extensible Markup Language (XML) documents, and/or text files.

Figure 3:
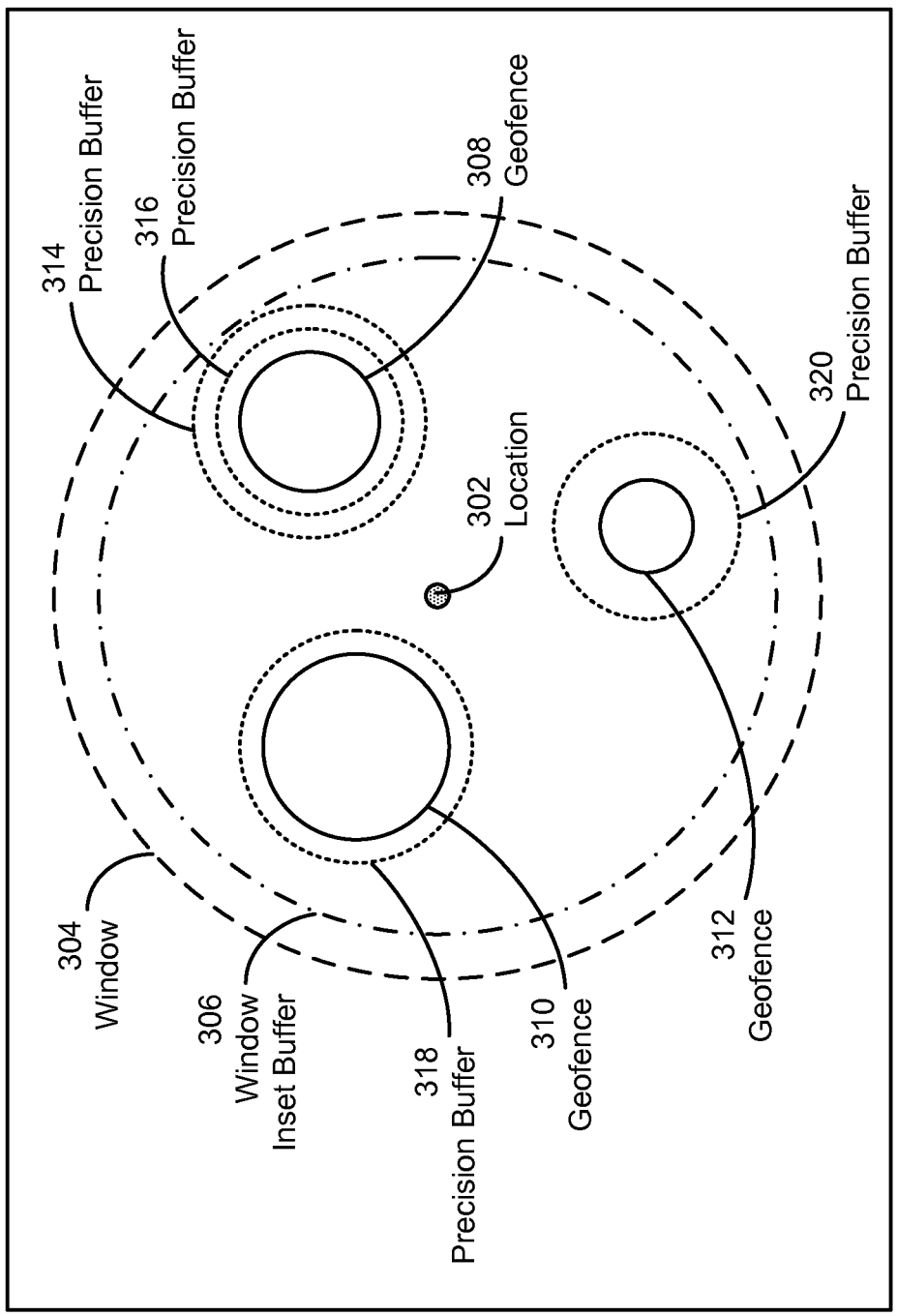
FIG. 3 shows an exemplary set of regions associated with geolocation of a user in accordance with the disclosed embodiments.

FIG. 3 shows an exemplary set of regions associated with geolocation of a user in accordance with the disclosed embodiments. As shown in FIG. 3, the regions include a window 304, a window inset buffer 306, three geofences 308-312, and four precision buffers 314-320. In addition, the regions may be circular regions with radii around pre-specified locations. For example, window 304 may be centered on a location 302 of the user and have a radius that is based on a speed of the user and/or a density of geofences 308-312 near location 302. Similarly, geofences 308-312 may be circular regions that are centered on pre-specified locations, such as locations of houses, stores, parks, companies, and/or other geographic points.

Alternatively, window 304, window inset buffer 306, geofences 308-312, and/or precision buffers 314-320 may be associated with other shapes and/or geographic attributes. For example, one or more geofences 308-312 and/or precision buffers 314-320 may be triangular, square, rectangular, and/or shaped according to boundaries around landmarks, buildings, islands, bodies of water, neighborhoods, and/or other geographic regions.

Each geofence 308-312 may also be surrounded by one or more precision buffers 314-320. For example, geofence 308 may be surrounded by precision buffer 316, which in turn is surrounded by a larger precision buffer 314. Similarly, geofences 310-312 may be surrounded by one precision buffer 318-320 each. As a result, geofences 308-312 and precision buffers 314-320 may form three sets of concentric regions within window 304.

Precision buffers 314-320 may be used to adjust a geolocation technique used to track location 302 as the user moves within window 304. In particular, each precision buffer 314-320 may be associated with a level of accuracy, which causes a geolocation technique used to track location 302 to adjust to that level of accuracy when location 302 is detected to be within the precision buffer.

For example, location 302 may be tracked using nearby cellular towers while location 302 is outside precision buffers 314-320 and geofences 308-312. Once location 302 is detected to be within precision buffer 314, location 302 may be tracked using WiFi triangulation, which is more accurate than cellular geolocation. Once location 302 is detected to be within precision buffers 316-320, location 302 may be tracked using a GPS receiver, which is more accurate than WiFi triangulation. Once the user enters one or more geofences 308-312, the GPS receiver may continue to be used to track location 302 and/or may be supplemented by RFID and/or another localized geolocation technique.

The number of precision buffers 314-320 may be based on the importance of geofences 308-312 and/or other attributes associated with use of geofences 308-312. For example, geofence 308 may have more precision buffers 314-316 than geofences 310-312 because detection of the user's entry into and/or exit from geofence 308 is more important than the user's entry into and/or exit from geofences 310-312. Alternatively, the number of precision buffers 314-320 around geofences 308-312 may be determined by the creators of geofences 308-312 and/or the user. Finally, the number of precision buffers 314-320 around geofences 308-312 may be based on the number of levels of accuracy available for tracking location 302.

Similarly, the sizes of precision buffers 314-320 may be calculated based on the sizes of geofences 308-312. For example, each precision buffer 314-320 may be calculated to be a certain percentage larger than the corresponding geofence 308-312. In addition, the percentage may be based on the accuracy of the geolocation technique used with the precision buffer; a larger percentage may correspond to a less accurate geolocation technique, while a smaller percentage may correspond to a more accurate geolocation technique.

The size of precision buffers 314-320 may be further adjusted based on upper and/or lower limits for precision buffers 314-320, which in turn may reflect the levels of accuracy associated with precision buffers 314-320. For example, precision buffer 320 may be calculated from a small geofence 312 and subject to a minimum precision buffer size, while precision buffer 318 may be calculated from a larger geofence 310 and thus exceed the minimum precision buffer size. As a result, the size of precision buffer 320 relative to geofence 312 may be larger than the size of precision buffer 318 relative to geofence 310, even if both precision buffers 318-320 are associated with the same level of accuracy. Alternatively, precision buffer 320 may require a larger size because precision buffer 320 is associated with a lower level of accuracy than precision buffer 318.

Finally, window inset buffer 306 may form a boundary associated with the updating of window 304, geofences 308-312, and/or precision buffers 314-320. If an update to location 302 is outside window inset buffer 306, window 304 may be re-centered on the updated location 302, and new geofences and/or precision buffers within the re-centered window 304 may be obtained. In other words, window inset buffer 306 may allow updates to window 304, geofences 308-312, and/or precision buffers 314-320 to be made as the user approaches the boundary of window 304. The new window 304, geofences, and/or precision buffers may then be ready for use with the user by the time the user crosses the boundary of the old window. As a result, the size of window inset buffer 306 relative to window 304 may be based on the speed of the user and/or the time required to obtain the new window 304 and/or regions within the new window 304.

Figure 4:
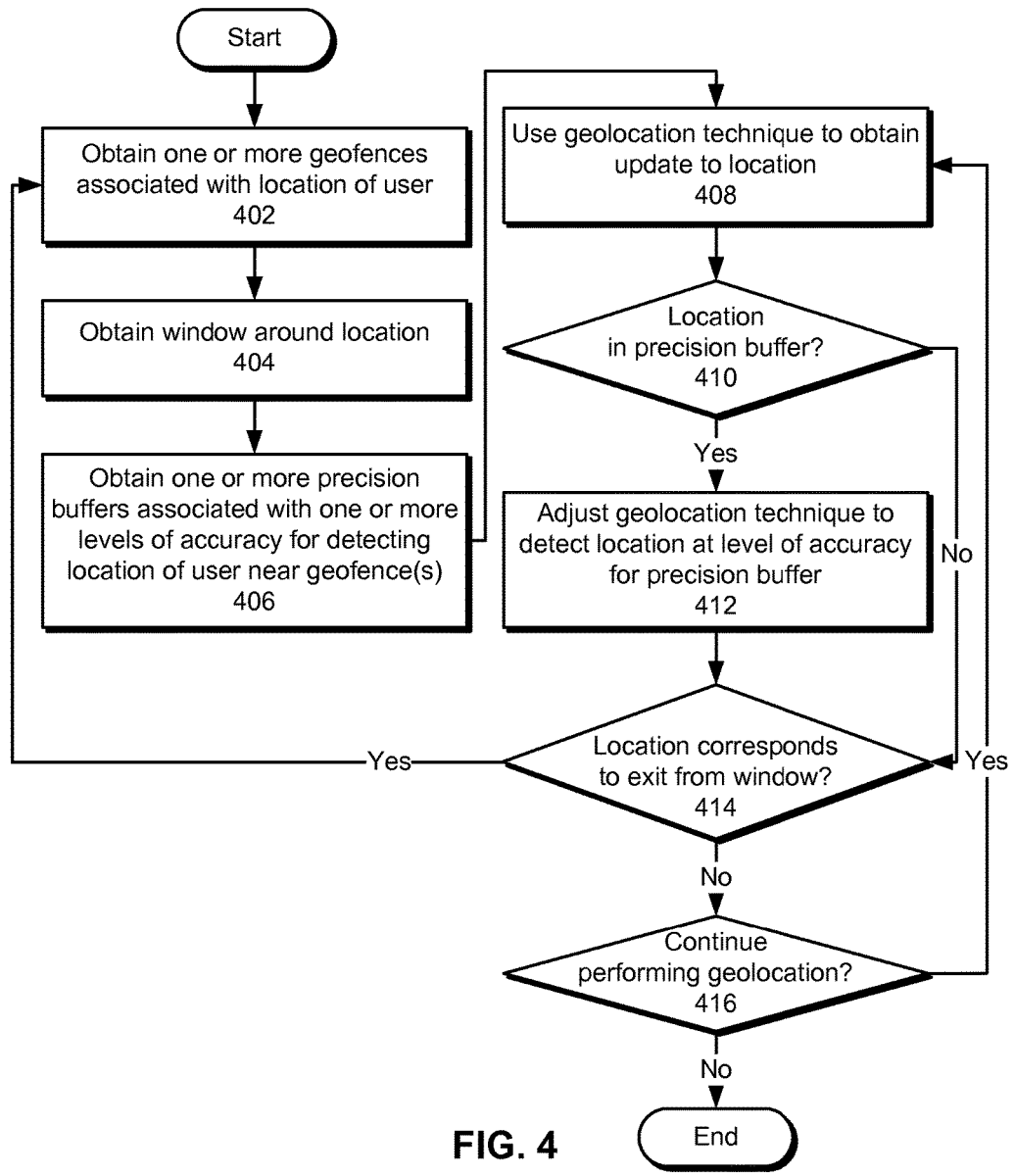
FIG. 4 shows a flowchart illustrating the process of performing geolocation of a user in accordance with the disclosed embodiments.

FIG. 4 shows a flowchart illustrating the process of performing geolocation of a user in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, one or more geofences associated with a location of the user are obtained (operation 402). The geofence(s) may be located within a window around the location, which is also obtained (operation 404). For example, the geofences may reside partially or completely within a window formed as a circular region centered on the user's location.

Next, one or more precision buffers associated with one or more levels of accuracy for detecting the location of the user near the geofence(s) are obtained (operation 406). The precision buffers may be obtained with the geofences and/or generated based on the size of the geofence(s), an upper and/or lower limit for the precision buffers, and/or a geolocation technique used to obtain the user's location. For example, the sizes and/or number of the precision buffers may be based on the characteristics of the geofence(s) and/or the types of geolocation (e.g., GPS, WiFi, cellular, Bluetooth, RFID, network address, user-provided, etc.) available for use with the geofences.

Use of the geofence(s) may then be facilitated by varying the geolocation technique based on the precision buffer(s). In particular, the geolocation technique is used to obtain an update for the location (operation 408), which may indicate that the user is in a precision buffer (operation 410). If the location is in the precision buffer, the geolocation technique is adjusted to detect the location at the level of accuracy for the precision buffer (operation 412). For example, the geolocation technique may be changed from cellular geolocation to WiFi triangulation to increase the level of accuracy used in tracking the user's location within the precision buffer. If the location is not in any precision buffers, the geolocation technique is not modified.

The location may also correspond to an exit from the window (operation 414). For example, the location may indicate that the user has crossed the boundary of a window inset buffer for the window. If the location corresponds to an exit from the window, updates to the window and the geofences are obtained (operations 402-404), and the precision buffers are updated to reflect the updated geofences (operation 406). The geolocation technique may then be used to update the location based on the updated precision buffers and/or geofences (operations 408-412). If the location does not correspond to an exit from the window, the window, geofences, and/or precision buffers are not updated.

Geolocation may continue to be performed (operation 416) while the geofences are being used. If geolocation of the user is to continue, the geolocation technique is varied based on the precision buffers (operations 408-412), and exits from the window (operation 414) are used to update the geofences, window, and/or precision buffers (operations 402-406). Geolocation may thus be performed until the geofences are no longer used with the user and/or geolocation of the user is disabled.

Figure 5:
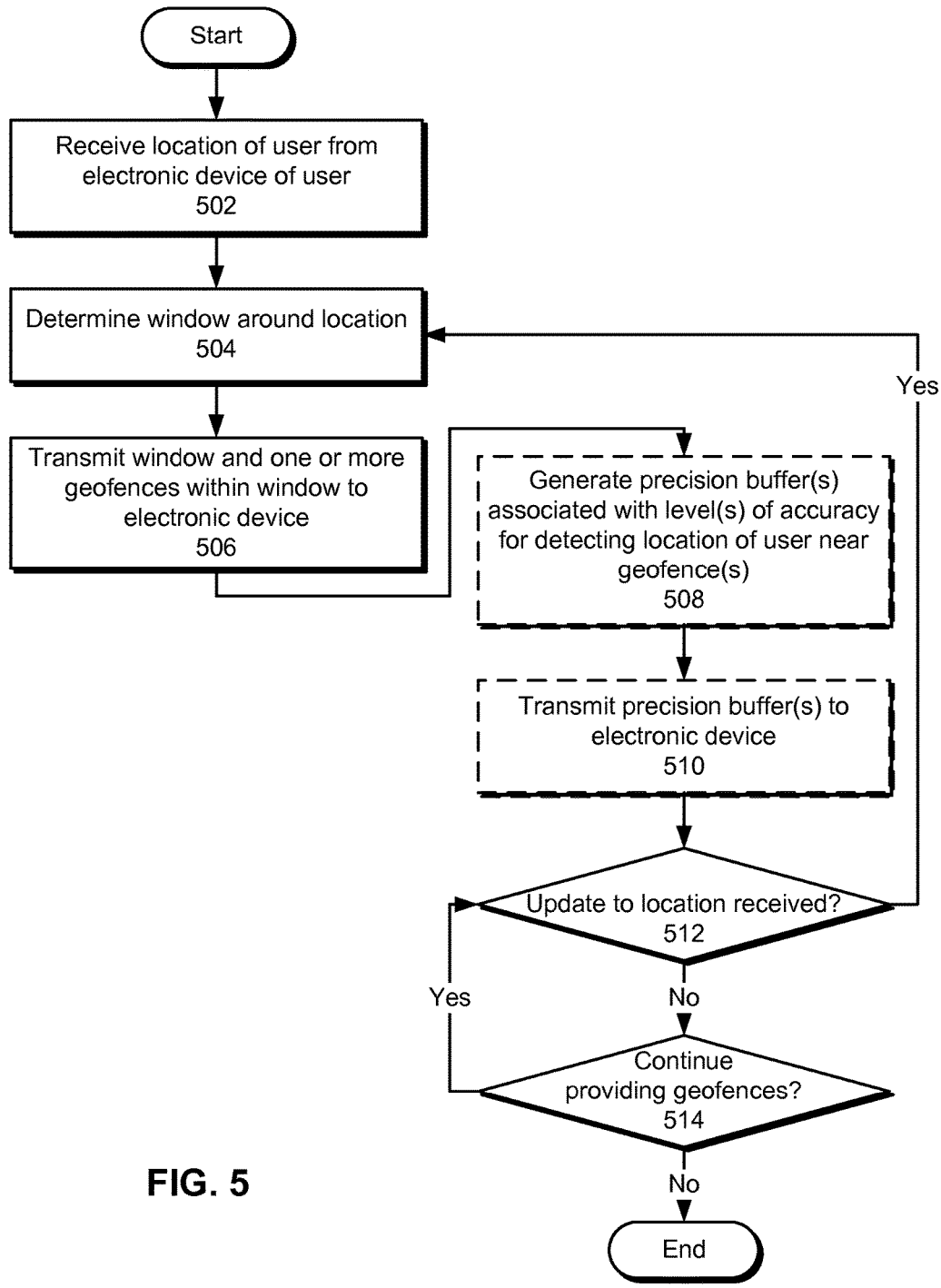
FIG. 5 shows a flowchart illustrating the process of facilitating geolocation of a user in accordance with the disclosed embodiments.

FIG. 5 shows a flowchart illustrating the process of facilitating geolocation of a user in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a location of the user is received from an electronic device of the user (operation 502). The location may be received as a set of coordinates, an address, a network (e.g., IP) address, and/or another set of attributes that may be used to locate the user. Next, a window around the location is determined (operation 504). For example, the window may be created as a circular region centered on the location with a radius that is based on the speed of the user and/or the density of geofences near the location.

The window and one or more geofences within the window are transmitted to the electronic device (operation 506) to enable use of the geofences with the user. Similarly, one or more precision buffers associated with one or more levels of accuracy for detecting the location of the user near the geofence(s) may optionally be generated (operation 508) and transmitted to the electronic device (operation 510). For example, the precision buffer(s) may be generated based on the size of the geofence(s), an upper limit and/or lower limit for the precision buffer(s), and/or the type and/or capabilities of the electronic device. Alternatively, the precision buffers may be generated on the electronic device based on criteria set by and/or stored on the electronic device.

An update to the location may be received (operation 512). For example, the update may be received periodically and/or when the user is about to exit the window. If the update is received, the window, geofence(s), and/or precision buffers are updated based on the updated location and transmitted to the electronic device (operation 504-510). If an update to the window is not received, the window, geofence(s), and precision buffers may not be updated.

The geofences may continue to be provided (operation 514) during use of the geofences with the user. If the geofences are to be provided, updates to the location (operation 512) are used to update the window, geofences, and/or precision buffers and transmit the updates to the electronic device (operations 504-510). The window, geofences, and/or precision buffers may thus continue to be provided while geofencing and/or geolocation is enabled on the electronic device.

Figure 6:
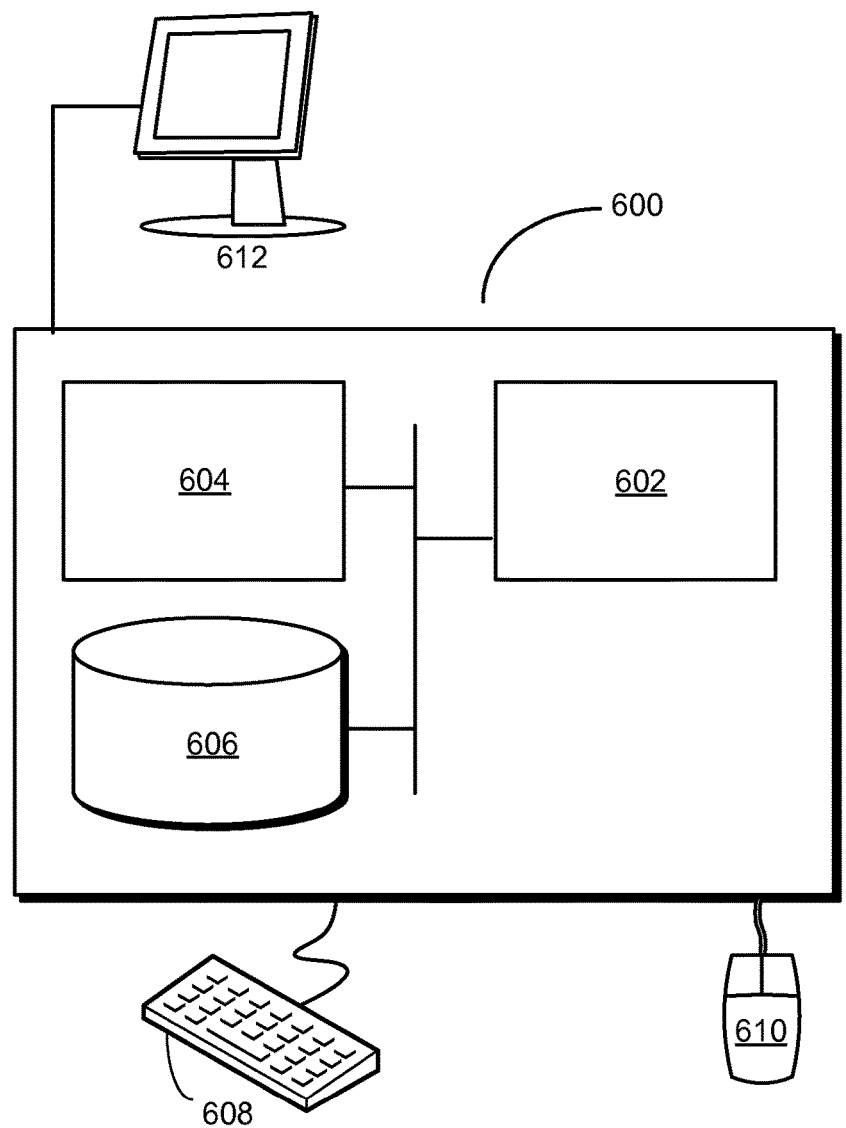
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating geolocation of a user. The system may include a server that receives a location of the user from an electronic device of the user. Next, the server may determine a window around the location. Finally, the server may transmit the window and one or more geofences within the window to the electronic device.

Alternatively, computer system 600 may implement the electronic device. The electronic device may obtain one or more precision buffers associated with one or more levels of accuracy for detecting the location of the user near the one or more geofences. Next, the electronic device may facilitate use of a location-based service associated with the one or more geofences by varying a geolocation technique for tracking the location of the user based on the one or more precision buffers. The electronic device may also use the geolocation technique to obtain an update to the location corresponding to an exit from the window by the user, and the server may update the window and the one or more geofences based on the update.

In addition, one or more components of computer system 600 may be remotely located and connected to the other components over a network. Portions of the present embodiments (e.g., geolocation apparatus, communication apparatus, electronic device, server, etc.) may also be located on different nodes of a distributed system that implements the embodiments. For example, the present embodiments may be implemented using a cloud computing system that facilitates the use of geofences with users from a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for performing geolocation of a user, comprising:
   obtaining one or more geofences associated with a location of the user, wherein the number of obtained geofences is based on a size of a window around the location and the size of the window is based on a speed of the user and a density of geofences in proximity to the user;
   obtaining one or more precision buffers associated with one or more levels of accuracy for detecting the location of the user near the one or more geofences, wherein the number of precision buffers is based on a type of device associated with the user;
   facilitating use of the one or more geofences by selecting from a plurality of geolocation techniques for tracking the location of the user based on the one or more precision buffers; and
   determining if the user has entered or exited one of the one or more geofences based on the location of the user and the one or more precision buffers.

2. The computer-implemented method of claim 1, further comprising:
   obtaining the window around the location, wherein the one or more geofences are located within the window.

3. The computer-implemented method of claim 2, further comprising:
using the selected geolocation technique of the plurality of geolocation techniques to obtain an update to the location corresponding to an exit from the window by the user; and
obtaining updates to the window and the one or more geofences based on the update to the location.

4. The computer-implemented method of claim 3, wherein the update to the location is associated with a boundary of a window inset buffer for the window.

5. The computer-implemented method of claim 1, wherein obtaining the one or more precision buffers for the one or more geofences involves at least one of:
obtaining the one or more precision buffers with the one or more geofences; and
generating the one or more precision buffers based on a size of the one or more geofences.

6. The computer-implemented method of claim 5, wherein the one or more precision buffers are further generated based on at least one of:
an upper limit for the one or more precision buffers;
a lower limit for the one or more precision buffers; and
the selected geolocation technique.

7. The computer-implemented method of claim 1, wherein selecting from the plurality of the geolocation techniques comprises:
detecting the location of the user in a precision buffer from the one or more precision buffers using a first geolocation technique; and
switching to a second geolocation technique to detect the location at a level of accuracy for the precision buffer.

8. The computer-implemented method of claim 1, wherein the one or more geofences and the one or more precision buffers correspond to one or more sets of concentric regions.

9. The computer-implemented method of claim 1, wherein a selected geolocation technique used for tracking the location of the user is associated with at least one of:
a Global Positioning System (GPS) receiver;
a wireless network;
a cellular network; and
a network address associated with the user.

10. A computer-implemented method for facilitating geolocation of a user, comprising:
receiving a location of the user from an electronic device of the user;
determining a window around the location, wherein the window is determined based on a speed of the user and a density of one or more geofences in proximity to the location;
transmitting the window and one or more geofences within the window to the electronic device;
generating one or more precision buffers associated with one or more levels of accuracy for detecting the location of the user near the one or more geofences, wherein the number of precision buffers is based on a type of the electronic device;
transmitting the one or more precision buffers to the electronic device;
upon receiving an update to the location from the electronic device, updating the window and the one or more geofences based on the update.

11. The computer-implemented method of claim 10, wherein a size of the one or more precision buffers is based on at least one of:
a size of the one or more geofences;
an upper limit for the one or more precision buffers; and
a lower limit for the one or more precision buffers.

12. A system for facilitating geolocation of a user, comprising:
an electronic device having a processor and a memory storing instructions which, when executed by the processor, performs an operation comprising:
obtaining one or more geofences associated with a location of a user of the electronic device, wherein the number of obtained geofences is based on a size of a window around the location, wherein the size of the window is based on a speed of the user and a density of geofences in proximity to the user;
obtaining one or more precision buffers associated with one or more levels of accuracy for detecting the location of the user near the one or more geofences, wherein the number of precision buffers is based on a type of the electronic device;
facilitating use of the one or more geofences by selecting from a plurality of geolocation techniques for tracking the location of the user based on the one or more precision buffers; and
determining if the user has entered or exited one of the one or more geofences based on the location of the user and the one or more precision buffers.

13. The system of claim 12, further comprising:
using the selected geolocation technique of the plurality of geolocation techniques to obtain an update to the location corresponding to an exit from the window by the user, and
obtaining an update to the window and the one or more geofences based on the update to the location corresponding to an exit from the window by the user.

14. The system of claim 13, wherein the update to the location is associated with a boundary of a window inset buffer for the window.

15. The system of claim 12, wherein obtaining the one or more precision buffers for the one or more geofences involves at least one of:
obtaining the one or more precision buffers from the server; and
generating the one or more precision buffers based on a size of the one or more geofences.

16. The system of claim 12, wherein selecting from the plurality of geolocation techniques comprises:
detecting the location of the user in a precision buffer from the one or more precision buffers using a first geolocation technique; and
switching to a second geolocation technique to detect the location at a level of accuracy for the precision buffer.

17. The system of claim 12, wherein the one or more geofences and the one or more precision buffers correspond to one or more sets of concentric regions.

18. The system of claim 12, wherein the geolocation technique is associated with at least one of:
a Global Positioning System (GPS) receiver;
a wireless network;
a cellular network; and
a network address associated with the user.

19. A non-transitory computer-readable storage medium storing instructions that when executed by a computer cause the computer to perform a method for performing geolocation of a user, the method comprising:
obtaining one or more geofences associated with a location of the user, wherein the number of obtained geofences is based on a size of a window around the location and the size of the window is based on a speed of the user and a density of geofences in proximity to the user;

obtaining one or more precision buffers associated with one or more levels of accuracy for detecting the location of the user near the one or more geofences, wherein the number of precision buffers is based on a type of device associated with the user;

facilitating use of the one or more geofences by selecting from a plurality of geolocation techniques for tracking the location of the user based on the one or more precision buffers; and determining if the user has entered or existed one of the one or more geofences based on the location of the user and the one or more precision buffers.

20. The non-transitory computer-readable storage medium of claim 19, the method further comprising:

obtaining the window around the location, wherein the one or more geofences are located within the window.

21. The non-transitory computer-readable storage medium of claim 20, the method further comprising:

using a first geolocation technique of the plurality of geolocation techniques to obtain an update to the location corresponding to an exit from the window by the user; and obtaining updates to the window and the one or more geofences based on the update to the location.

22. The non-transitory computer-readable storage medium of claim 19, wherein obtaining the one or more precision buffers for the one or more geofences involves at least one of:

obtaining the one or more precision buffers with the one or more geofences; and generating the one or more precision buffers based on a size of the one or more geofences.

23. The computer-readable storage medium of claim 19, wherein a size of the one or more precision buffers is based on at least one of:

an upper limit for the one or more precision buffers; and a lower limit for the one or more precision buffers.

24. The non-transitory computer-readable storage medium of claim 19, wherein selecting from the plurality of geolocation techniques comprises:

detecting the location of the user in a precision buffer from the one or more precision buffers using a first geolocation technique; and switching to a second geolocation technique to detect the location at a level of accuracy for the precision buffer.

25. The non-transitory computer-readable storage medium of claim 19, wherein the selected geolocation technique is associated with at least one of:

a Global Positioning System (GPS) receiver;

a wireless network;

a cellular network; and a network address associated with the user.

\* \* \* \* \*